United States Patent
Tien

(10) Patent No.: US 8,103,286 B2
(45) Date of Patent: Jan. 24, 2012

(54) WIRELESS COMMUNICATION SYSTEM FOR AUTOMATICALLY GENERATING A RECEIVED SIGNAL STRENGTH DISTRIBUTION MAP

(75) Inventor: Kai-Wen Tien, Tainan (TW)

(73) Assignee: Quanta Computer Inc. (TW)

( * ) Notice: Subject to any disclaimer, the term of this patent is extended or adjusted under 35 U.S.C. 154(b) by 796 days.

(21) Appl. No.: 11/907,207

(22) Filed: Oct. 10, 2007

(65) Prior Publication Data

US 2008/0227470 A1 Sep. 18, 2008

(30) Foreign Application Priority Data

Mar. 14, 2007 (TW) .............................. 96108710 A

(51) Int. Cl.
*H04W 24/00* (2009.01)
(52) U.S. Cl. ...................... 455/456.1; 370/328; 455/423
(58) Field of Classification Search ............... 455/422.1, 455/421, 423–425, 456.1–456.6
See application file for complete search history.

(56) References Cited

U.S. PATENT DOCUMENTS

| | | | |
|---|---|---|---|
| 6,204,812 B1 * | 3/2001 | Fattouche | 342/457 |
| 6,266,514 B1 * | 7/2001 | O'Donnell | 455/67.13 |
| 6,675,009 B1 * | 1/2004 | Cook | 455/420 |

FOREIGN PATENT DOCUMENTS

| | | |
|---|---|---|
| CN | 1570664 | 1/2005 |
| CN | 1672061 | 9/2005 |
| TW | 200707309 | 8/2005 |
| TW | I237124 | 8/2005 |
| WO | 0050919 | 8/2000 |
| WO | 2005096568 | 12/2005 |

OTHER PUBLICATIONS

Office Action in related Chinese Patent Application.
English Translation of Office Action in related Chinese Patent Application.
English Translation of CN1672061.
English Translation of CN1570664.

* cited by examiner

*Primary Examiner* — Vladimir Magloire
(74) *Attorney, Agent, or Firm* — Thomas, Kayden, Horstemeyer & Risley, LLP.

(57) ABSTRACT

The invention discloses a wireless communication system including first mobile devices, a second mobile device, and a system end. The system end cooperates with the second device to determine a coordinate of each of the first mobile devices. When each of the first mobile devices receives a signal from the system end, each of the first mobile devices can detect its corresponding received signal strength. The system end or the second mobile device is capable of generating a received signal strength distribution map according to the coordinates and the strengths of the received signals.

14 Claims, 6 Drawing Sheets

WIRELESS COMMUNICATION SYSTEM FOR AUTOMATICALLY GENERATING A RECEIVED SIGNAL STRENGTH DISTRIBUTION MAP

BACKGROUND OF THE INVENTION

1. Field of the Invention

The invention relates to a wireless communication system, and particularly, to a wireless communication system for automatically generating a received signal strength (RSS) distribution map.

2. Description of the Prior Art

In recent years, the wireless communication positioning technology is full of vitality, and the application range of the technology has also become broader and broader. For example, the positioning technology can be applied to a navigating system, a user position information management, a mobile emergency positioning (e.g., the related positioning requirement of the mobile for the E-911 law in the United States), a logistics management, and a motorcade mobilization.

In general, a received signal strength (RSS) distribution map will be established beforehand for positioning the mobile devices. At present, a fingerprint method is usually used for establishing the RSS distribution map. When the fingerprint method is used for establishing the RSS distribution map, a map that contains the entire positioning environment is needed, and the fingerprint is sampled by an electronic device which can detect signals in the entire positioning environment. When the positioning environment is very large, it takes a lot of time and cost to establish the RSS distribution map by the fingerprint method. Besides, positioning errors will occur when the positioning environment changed while the RSS distribution map formerly established is not updated.

Therefore, the scope of the invention is to provide a wireless communication system for automatically generating a RSS distribution map.

SUMMARY OF THE INVENTION

A scope of the invention is to provide a wireless communication system for automatically generating a RSS distribution map.

According to a preferred embodiment, the wireless communication system of the invention comprises a plurality of first mobile device, a second mobile device, and a system end. The system end cooperates with the second mobile device to determine a coordinate of each of the first mobile devices. When each of the first mobile devices receives a signal from the system end, each of the first mobile devices is capable of detecting a corresponding RSS. The system end or the second mobile device is capable of automatically generating a RSS distribution map according to the coordinates and the RSSs.

Thus, the function of the wireless communication system of the invention is to use the coordinates and the RSS of the mobile devices to automatically generate the RSS distribution map. By doing so, the mobile device can fastly determine the coordinate of the mobile device itself via the RSS distribution map.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
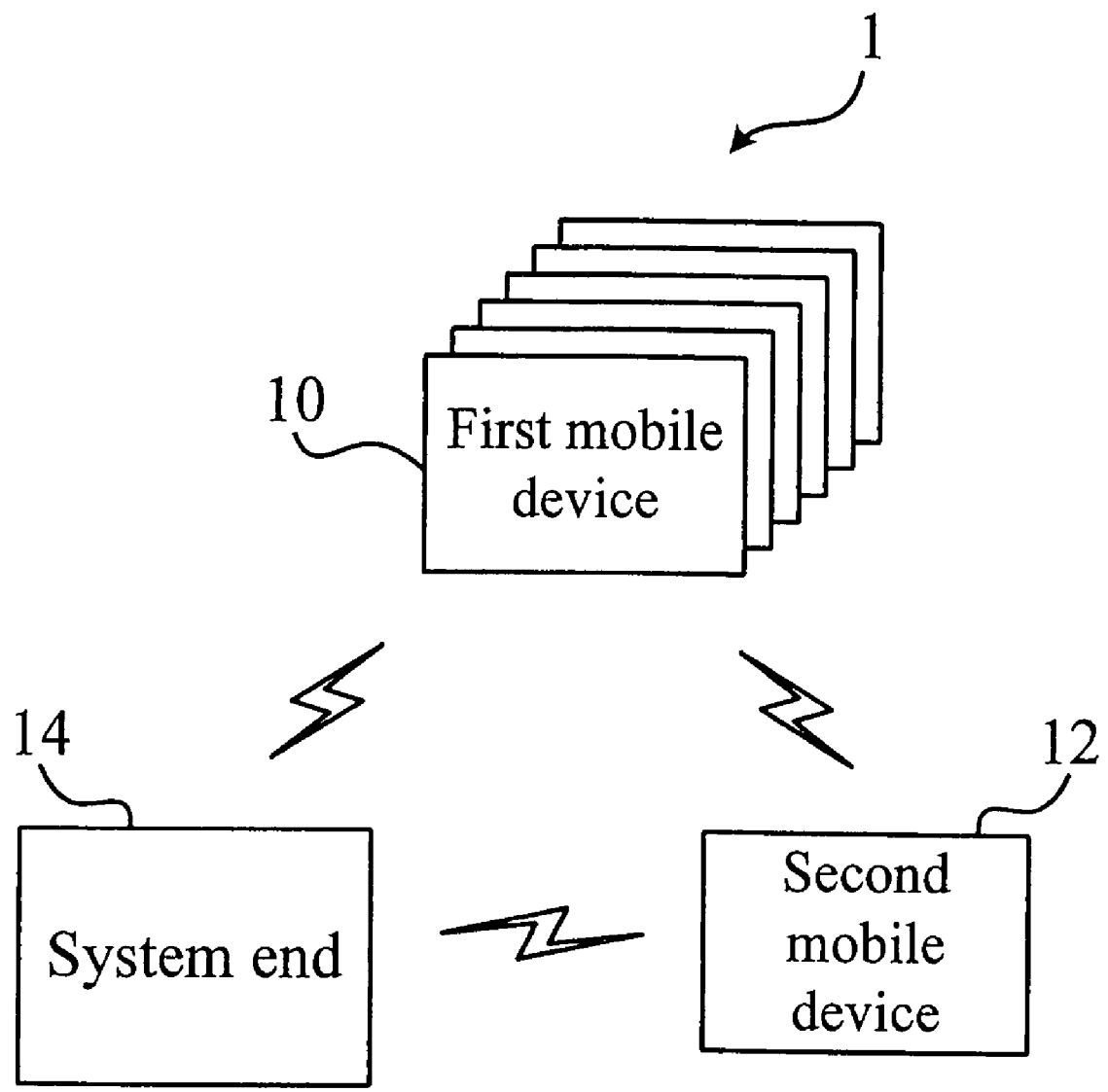
FIG. 1 is a functional block diagram of the wireless communication system in the first preferred embodiment according to the invention.
Figure 2:
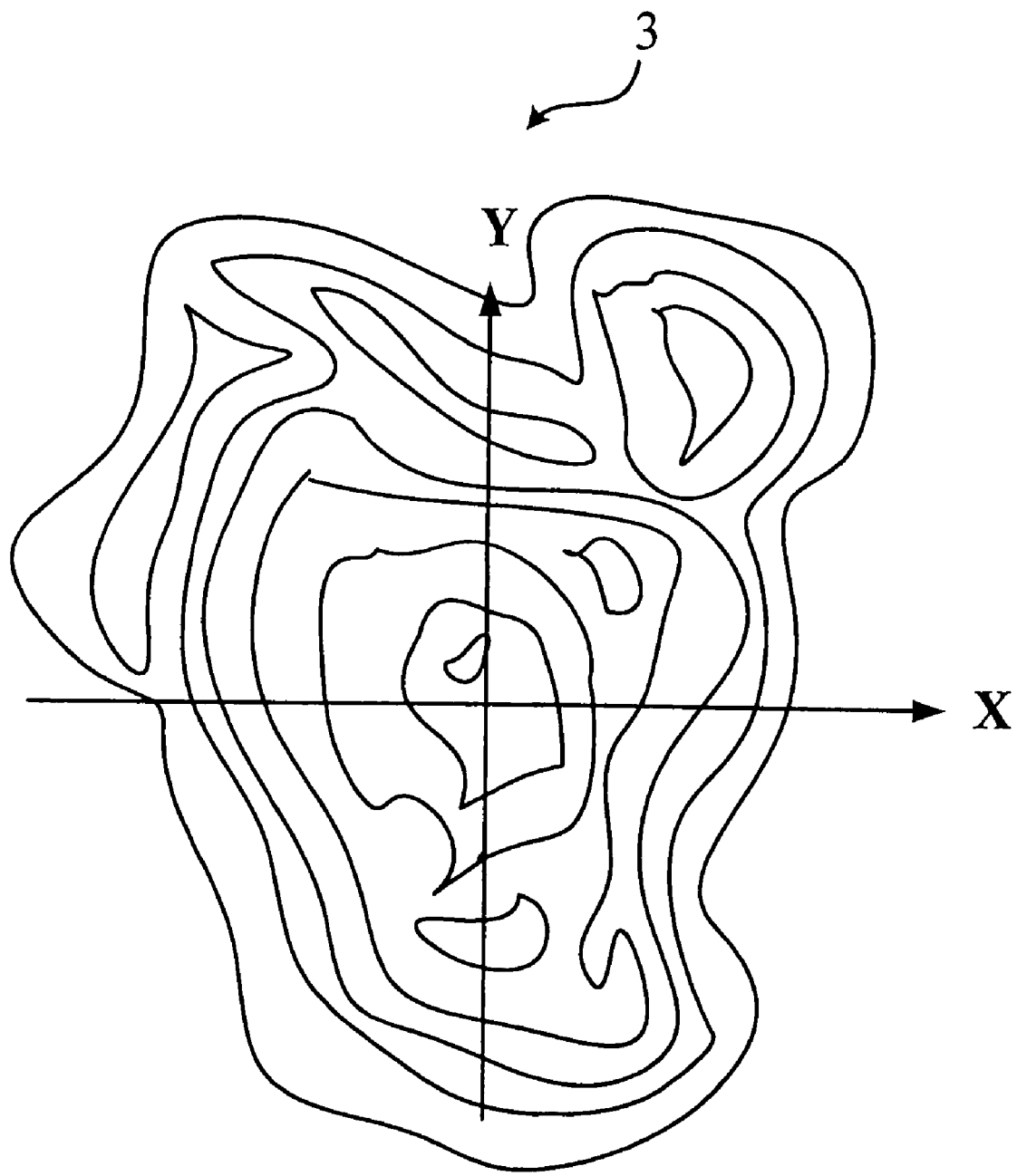
FIG. 2 is a diagram of the RSS distribution map automatically generated by the wireless communication system in FIG. 1.

Please refer to FIG. 1 and FIG. 2. FIG. 1 is a functional block diagram of the wireless communication system 1 of a preferred embodiment according to the invention. FIG. 2 is a diagram of the RSS distribution map 3 automatically generated by the wireless communication system 1. As shown in FIG. 2, the RSS distribution map 3 is a distribution map of the coordinates with respect to the RSS and used for determining the coordinates according to the RSSs. In the embodiment, the wireless communication system 1 is used to automatically generate the RSS distribution map 3.

As shown in FIG. 1, the wireless communication system 1 comprises a plurality of first mobile devices 10, a second mobile device 12, and a system end 14. The system end 14 can be a base station, but it is not limited to that. The first mobile device 10 and the second mobile device 12 can be a notebook, a PDA, a navigating device, a mobile, or other similar mobile devices. The system end 14 has at least one wireless positioning algorithm selected from a group consisting of: time of arrival (TOA) algorithm, time difference of arrival (TDOA) algorithm, direction of arrival (DOA) algorithm, RSS algorithm, and other similar wireless positioning algorithm. The second mobile device 12 has at least one wireless positioning algorithm selected from a group consisting of: TOA algorithm, TDOA algorithm, RSS algorithm, and other similar wireless positioning algorithm. When the first mobile device 10 receives the signal from the system end 14, the first mobile device 10 can detect the corresponding RSSs.

Figure 3:
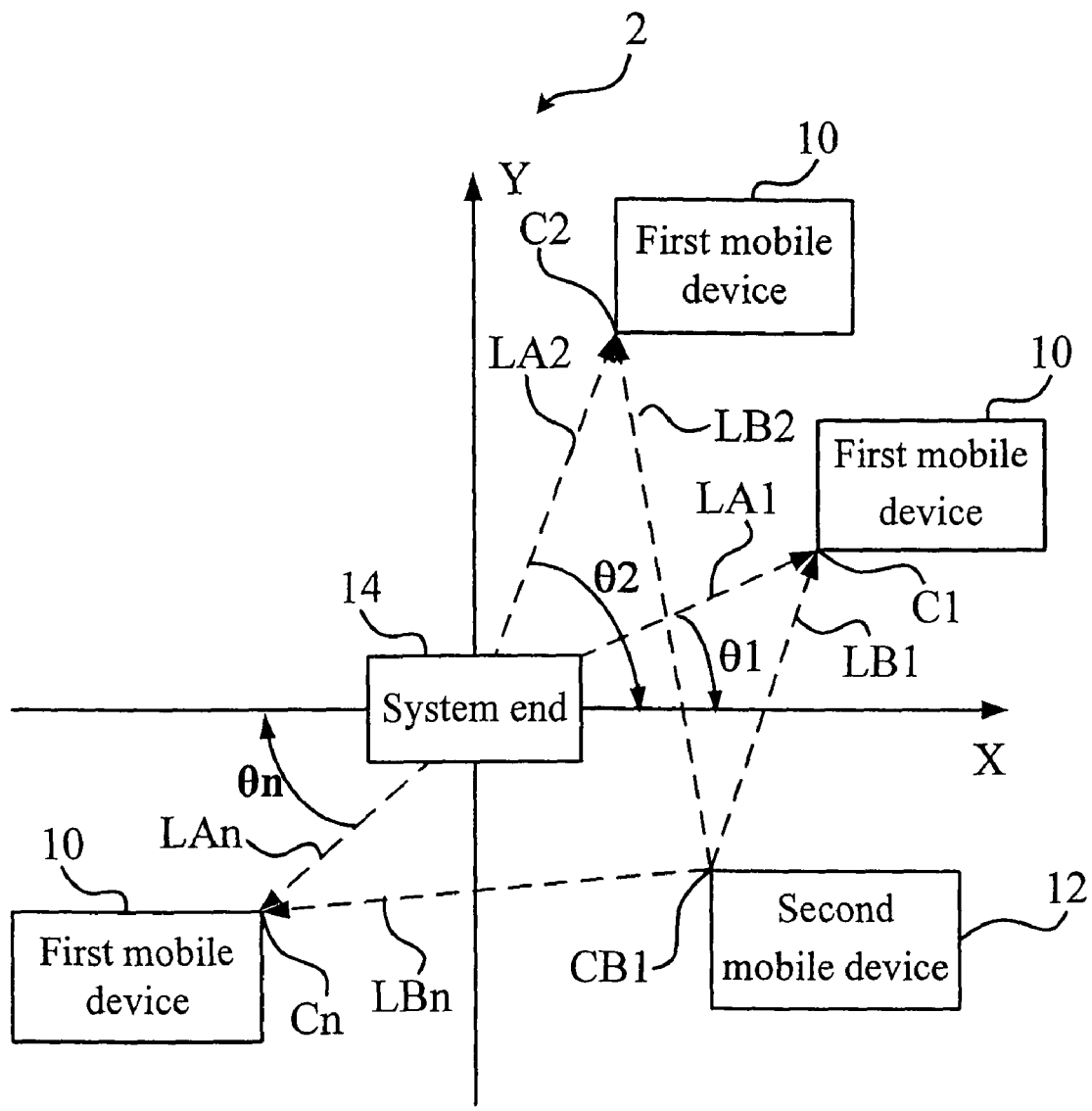
FIG. 3 is a diagram of the wireless communication system in FIG. 1 positioning the first mobile device.

Please refer to FIG. 3. FIG. 3 is a diagram of the wireless communication system 1 in FIG. 1 positioning the first mobile device 10. In the embodiment, the system end 14 cooperates with the second mobile device 12 to determine the coordinates of each of the first mobile devices 10. As shown in FIG. 3, a coordinate system 2 is established in advance by the system end 14. The system end 14 is at the original point of the coordinate system 2, and the coordinate system 2 has a X axis and a Y axis. Then, the system end 14 can use TOA algorithm, TDOA algorithm, or RSS algorithm to determine the distances LA1-LAn between the system end 14 and each of the first mobile devices 10. And, DOA algorithm is used to determine the angles θ1-θn corresponding to the X axis or the Y axis for each of the first mobile device 10. In the embodiment, the coordinate CB1 of the second mobile device 12 is already known. The second mobile device 12 can use TOA algorithm, TDOA algorithm, or RSS algorithm to determine the distances LB1-LBn between the second mobile device 12 and each of the first mobile devices 10. The system end 14 can determine the coordinates C1-Cn of each of the first mobile devices 10 on the coordinate system 2 according to the distances LA1-LAn between the system end 14 and each of the first mobile devices 10, the angles θ1-θn, each of which the first mobile device 10 corresponds to the X axis or the Y axis, and the distances LB1-LBn between the second mobile device 12 and each of the first mobile devices 10. By doing that, the coordinates C1-Cn of each of the first mobile devices 10 can be obtained. It should be noticed that the function of the second mobile device 12 is to cooperate with the system end 14 for the more accurate positioning of the first mobile device 10. Besides, the number of the second mobile device 12 can be larger than 1 to increase the efficiency and the accuracy of positioning.

When each of the first mobile devices 10 receives the signal from the system end 14, each of the first mobile devices 10 would detect the corresponding RSSs. Then, each of the first mobile devices 10 can transmit the corresponding RSS to the system end 14 or the second mobile device 12. Thus, the system end 14 or the second mobile device 12 can automatically generate the RSS distribution map 3 as shown in FIG. 2 according to the coordinates C1-Cn and the corresponding RSSs of each of the first mobile devices 10.

Figure 4:
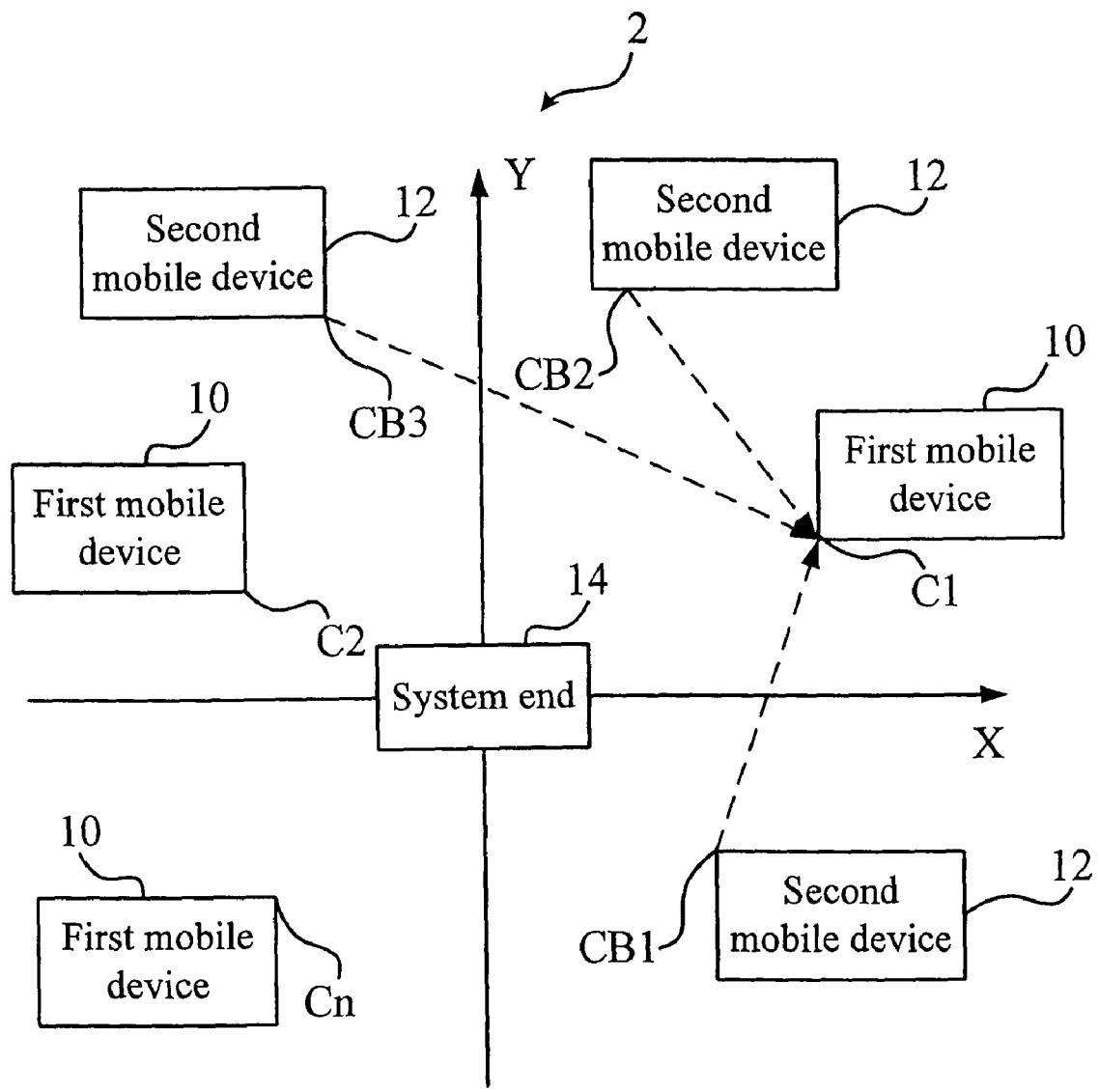
FIG. 4 is a diagram of the wireless communication system in FIG. 1 positioning the first mobile device in another preferred embodiment according to the invention.

Please refer to FIG. 4. FIG. 4 is a diagram of the wireless communication system 1 in FIG. 1, positioning the first mobile device 10 of another preferred embodiment according to the invention. In the embodiment, the wireless communication system 1 has three second mobile devices 12. Each of the second mobile devices 12 respectively has at least one wireless positioning algorithm selected from a group consisting of: TOA algorithm, TDOA algorithm, RSS algorithm, and other similar wireless positioning algorithm. The coordinates CB1-CB3 of the second mobile devices are already known. As shown in FIG. 4, the three second mobile devices 12 can use TOA algorithm, TDOA algorithm, or RSS algorithm, and cooperate with a triangle positioning algorithm to determine the coordinates C1-Cn of the first mobile devices. The triangle positioning algorithm can be easily achieved by those who knows the prior art well. It is not unnecessarily described here. In practical applications, the number of the second mobile devices 12 can be larger than 3 to increase the efficiency and the accuracy of positioning.

When each of the first mobile devices 10 receives the signal from the system end 14, each of the first mobile devices 10 would detect the first corresponding RSS. Then, each of the first mobile devices 10 can transmit the first corresponding RSS to the system end 14 or the second mobile device 12. Thus, the system end 14 or the second mobile device 12 can automatically generate the RSS distribution map 3 as shown in FIG. 2, according to the coordinates C1-Cn of the first mobile devices 10 and the RSSs of the first mobile devices 10.

The RSS distribution map 3 is used for positioning the target mobile device (not shown in the figure). When the target mobile device receives the signals from the system end 14, the target mobile device will detect the corresponding RSS. Then, the target mobile device can determine the coordinates of the target mobile device according to the RSSs and the RSS distribution map 3. It should be noticed that when the larger the number of the first mobile device becomes, the more accurate the positioning method using the RSS distribution map 3 is. In addition, when the RSS distribution map 3 is not accurate enough to determine the coordinate of the target mobile device, the wireless positioning algorithm of the system end 14 and/or the second mobile device 12 can be cooperated to determine the coordinate of the target mobile device more accurately.

In practical applications, when the target coordinate (not shown in the figure) of the RSS distribution map 3 lacks the corresponding RSS, the system end 14 or the second mobile device 12 can calculate the RSS corresponding to the X value of the target coordinate and the RSS corresponding to the Y value, respectively, according to the coordinates in the RSS distribution map 3 and the corresponding RSS by using the least squares method. Then, an average RSS is obtained by averaging the RSS corresponding to the X value of the target coordinate and the RSS corresponding to the Y value to be the RSS of the target coordinate. When the first mobile device 10 is moved to the target coordinate, the RSS calculated by the least squares method is replaced by the real RSS.

In practical applications, when a new first mobile device 10 is added to the wireless communication system 1, or when the first mobile device 10 is moved to different coordinates, the RSS distribution map 3 can be updated by the wireless communication system 1 to ensure more accurate positioning, and it will not be affected by the change of the environment. In addition, when the RSS distribution map 3 has enough coordinates and RSSs as samples, the wireless positioning function of the system end 14 and/or the second mobile device 12 can be selectively stopped temporarily to save on the electricity cost. For example, the second mobile device 12 can selectively enable or disable the wireless positioning function of the second mobile device 12 any time according to the integrity of the RSS distribution map 3 in the positioning range of the second mobile device 12 to save on the electricity cost. The positioning range of the second mobile device 12 depends on the wireless standard used in the second mobile device 12. For example, the positioning range of the UWB and the bluetooth is 10 meters; the positioning range of the 802.11b/g area network is 50-100 meters. It should be noticed that the wireless standard used in the second mobile device 12 is not limited to that.

Figure 5:
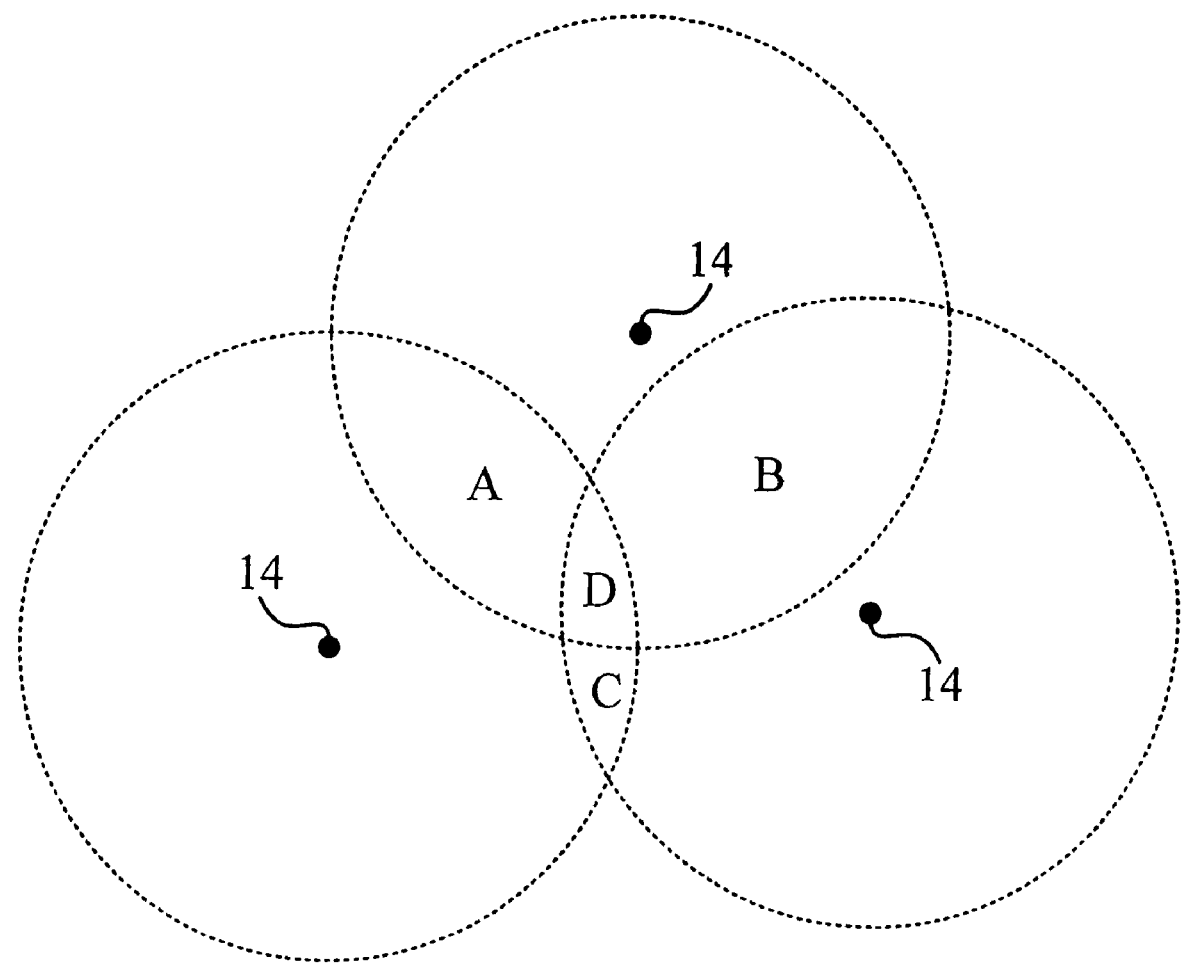
FIG. 5 shows the connecting range of three different system ends.

Please refer to FIG. 5. When a mobile device (not shown in FIG. 5) is in a region covered by a plurality of system ends 14 (FIG. 5 shows only three system ends 14), an RSS distribution map with higher accuracy can be generated according to the invention. As shown in FIG. 5, the connecting ranges of three different system ends are represented by three circles with dotted line. The different regions covered by the three system ends 14 are represented as A, B, C, D, respectively. The three system ends 14 are connected with each other by network. When the mobile device moves randomly in the regions A, B, C, or D, it is capable of communicating with each system end 14 respectively.

Figure 6:
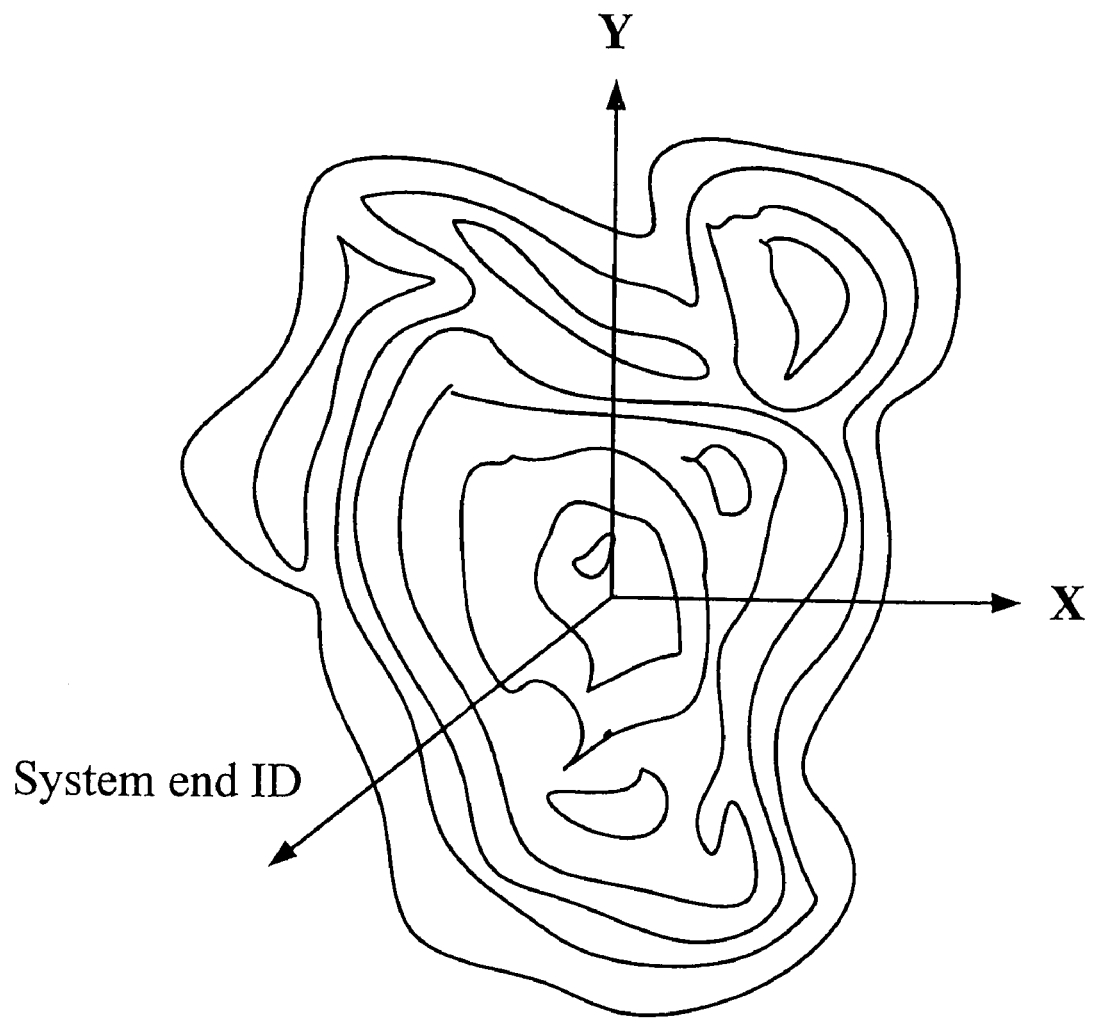
FIG. 6 is a diagram of the RSS distribution map generated by the coordinates, system ends, and RSSs.

The mobile device is capable of recording the RSSs of different system ends in the common regions A, B, C, D, and the RSS is the strongest among the regions. Please refer FIG. 6. FIG. 6 is a diagram of the RSS distribution map generated by the coordinates, system ends, and RSSs. The method is not limited by the above RSS distribution map corresponding to single system end. That is to say, when a plurality of system ends covers a region jointly, the invention can position the mobile device more accurate. Furthermore, the invention can keep the best connecting state when the mobile device connects to the system end.

Compared to the prior art, the wireless communication system of the invention is to use the coordinates of the mobile devices and the RSSs of the mobile devices for automatically generating the RSS distribution map 3. In this way, the mobile device can promptly determine the coordinate of the mobile device itself by the RSS distribution map. Due to the number of the mobile device becomes larger and larger, the wireless communication system of the invention will be more efficient and cost-effective for establishing the RSS distribution map.

In addition, by updating the RSS distribution map, the wireless communication system of the invention makes the positioning more accurate and would not be affected by the change of the environment.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A wireless communication system, comprising:
    a plurality of first mobile devices;
    a second mobile device, which is configured to determine a first distance between the second mobile device and each of the first mobile devices; and
    at least one system end, which is configured to determine a second distance between the system and each of the first mobile devices and an angle of the each of the first mobile devices corresponding to a X axis and a Y axis of a coordinate system of the at least one system end, cooperating with the second mobile device to determine a coordinate for each of the first mobile devices according to a coordinate of the second mobile device, the first distances, the second distances, and the angles;
    wherein when each of the first mobile devices receives a signal from the at least one system end, each of the first mobile devices is configured to detect a corresponding received signal strength (RSS), which is then transmitted to the at least one system end or the second mobile device, according to a received signal from the at least one system end, and when the each of the first mobile devices receives signals from the at least one system end, the coordinate of the each of the first mobile devices corresponds to the strongest RSS of the at least one system end, the second mobile device or the at least one system end is configured to automatically generate an RSS distribution map of the first mobile devices according to the coordinates of the first mobile devices, the at least one system end, and the strongest RSSs corresponding to the at least one system end, wherein the RSS distribution map is for positioning a target mobile device according to a corresponding RSS of the target mobile device.

2. The wireless communication system of claim 1, wherein the system end is a base station.

3. The wireless communication system of claim 1, wherein the system end has at least one wireless positioning algorithm selected from a group consisting of: time of arrival (TOA) algorithm, time difference of arrival (TDOA) algorithm, direction of arrival (DOA) algorithm, and RSS algorithm.

4. The wireless communication system of claim 1, wherein the second mobile device has at least one wireless positioning algorithm selected from a group consisting of: TOA algorithm, TDOA algorithm, and RSS algorithm.

5. The wireless communication system of claim 1, wherein according to the coordinates of the first mobile devices and the RSSs, the system end or the second mobile device utilizes a least squares method to calculate a RSS, and the RSS corresponds to a target coordinate of the RSS distribution map.

6. The wireless communication system of claim 3, wherein the system end is configured to disable all the wireless positioning algorithm any time according to the integrity of the RSS distribution map generated by the second mobile device to save on the electricity cost.

7. The wireless communication system of claim 4, wherein the second mobile device is configured to disable all the wireless positioning algorithm any time according to the integrity of the RSS distribution map generated by the at least one system end to save on the electricity cost.

8. A wireless communication system, comprising:
    a plurality of first mobile devices;
    three second mobile devices, each of the second mobile devices cooperating with each other to determine a coordinate of each of the first mobile devices according to a plurality of coordinates of the three second mobile devices; and
    a system end;
    wherein when each of the first mobile devices receives a signal from the system end, each of the first mobile devices is configured to detect a corresponding received signal strength (RSS), which is then transmitted to the system end or the second mobile devices, according to a received signal from the system end such that the system end or each of the second mobile devices is configured to automatically generate an RSS distribution map of the first mobile devices according to the coordinates of the first mobile devices and the RSSs, the coordinates of the first mobile devices corresponding to the strongest RSSs of the system end, wherein the RSS distribution map is for positioning a target mobile device according to a corresponding RSS of the target mobile device.

9. The wireless communication system of claim 8, wherein the system end is a base station.

10. The wireless communication system of claim 8, wherein the system end has at least one wireless positioning algorithm selected from a group consisting of: time of arrival (TOA) algorithm, time difference of arrival (TDOA) algorithm, direction of arrival (DOA) algorithm, and RSS algorithm.

11. The wireless communication system of claim 8, wherein each of the second mobile devices has at least one wireless positioning algorithm, respectively, selected from a group consisting of: time of arrival (TOA) algorithm, time difference of arrival (TDOA) algorithm, and RSS algorithm.

12. The wireless communication system of claim 8, wherein according to the coordinates of the first mobile devices and the RSSs, the system end or each of the three second mobile devices utilizes a least squares method to calculate a RSS, the RSS corresponds to a target coordinate of the RSS distribution map.

13. The wireless communication system of claim 11, wherein the system end is configured to disable all the wireless positioning algorithm any time according to the integrity of the RSS distribution map generated by each of the second mobile devices to save on the electricity cost.

14. The wireless communication system of claim 12, wherein each of the three second mobile devices is configured to disable all the wireless positioning algorithm any time according to the integrity of the RSS distribution map generated by the at least one system end to save on the electricity cost.

* * * * *